(12) United States Patent
Matayabas, Jr. et al.

(10) Patent No.: US 7,794,623 B2
(45) Date of Patent: Sep. 14, 2010

(54) MICROELECTRONIC DEVICE HAVING LIQUID CRYSTALLINE EPOXY RESINS

(75) Inventors: James Christopher Matayabas, Jr., Chandler, AZ (US); Paul Koning, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/151,332

(22) Filed: May 6, 2008

(65) Prior Publication Data

US 2008/0237897 A1 Oct. 2, 2008

Related U.S. Application Data

(62) Division of application No. 10/815,607, filed on Mar. 31, 2004, now Pat. No. 7,417,111.

(51) Int. Cl.
*G03C 5/00* (2006.01)
*C09K 19/52* (2006.01)
*H01L 27/15* (2006.01)
*H01L 23/28* (2006.01)
*C08G 59/00* (2006.01)

(52) U.S. Cl. .................. 252/299.01; 430/311; 430/321; 257/79; 257/788; 528/403

(58) Field of Classification Search ............ 252/299.01; 430/311, 321; 257/79, 788; 528/403
See application file for complete search history.

(56) References Cited

U.S. PATENT DOCUMENTS 5,182,394 A 1/1993 Kim
5,578,660 A 11/1996 Fujita et al.
5,780,145 A 7/1998 Hirano et al.
5,939,473 A 8/1999 Hirano et al.
6,338,902 B1 1/2002 Hsu et al.
6,620,512 B2 9/2003 Jayaram et al.
6,702,955 B1 3/2004 Murakami et al.
6,830,825 B2 * 12/2004 Sumiyoshi et al. .......... 428/620
6,924,027 B2 8/2005 Matayabas, Jr. et al.
7,041,736 B2 5/2006 Jayaram et al.
7,084,236 B2 8/2006 Duineveld et al.
7,202,304 B2 4/2007 Jayaram et al.
2004/0124526 A1 7/2004 Matayabas, Jr. et al.
2004/0176566 A1 9/2004 Duineveld et al.
2004/0191503 A1 9/2004 Matayabas, Jr. et al.
2005/0040507 A1 2/2005 Matayabas, Jr. et al.
2005/0041406 A1 2/2005 Matayabas, Jr. et al.
2005/0124785 A1 6/2005 Matayabas, Jr.
2005/0287355 A1 12/2005 Matayabas, Jr.
2005/0288454 A1 12/2005 Matayabas, Jr. et al.

OTHER PUBLICATIONS

Mary E. Nuebert, et al., Mol. Cryst. Liq. Cryst., 1987—vol. 145, pp. 111-157. "the Effect of Carbonyl Containing Substituents in the Terminal Chains on Mesomorphic Properties in Aromatic Esters and Thioesters, 2 . . .".

* cited by examiner

*Primary Examiner*—Geraldina Visconti
(74) *Attorney, Agent, or Firm*—Blakely, Sokoloff, Taylor & Zafman LLP

(57) ABSTRACT

Liquid crystalline epoxy compounds, compositions including the compounds, and methods of using the compositions are disclosed. In one aspect, an epoxy compound may have a melting point that is less than 140° C. and may be liquid crystalline at a temperature greater than 150° C.

10 Claims, No Drawings

MICROELECTRONIC DEVICE HAVING LIQUID CRYSTALLINE EPOXY RESINS

The present application is a divisional of U.S. patent application Ser. No. 10/815,607, filed Mar. 31, 2004 now U.S. Pat. No. 7,417,111, entitled "LIQUID CRYSTALLINE EPOXY RESINS". The U.S. patent application Ser. No. 10/815,607 is hereby incorporated herein by reference.

BACKGROUND

1. Field

An embodiment of the invention relates to a liquid crystalline epoxy resin.

2. Background Information

Various liquid crystalline epoxy resins, their properties, and their uses are known in the arts. Examples of liquid crystalline epoxy resins include epoxylated trans-stilbenediol and epoxylated 3,3,5,5-tetramethyltrans-stilbenediol. Such liquid crystalline epoxy resins generally exhibit unique properties, such as low viscosity flow. The low viscosity flow may allow the resins to be more easily flowed into narrow or confined spaces. However, such liquid crystalline epoxy resins also generally tend to have relatively high melting points. The high melting points may potentially limit the use of the resins.

DETAILED DESCRIPTION

In the following description, numerous specific details are set forth. However, it is understood that embodiments of the invention may be practiced without these specific details. In other instances, well-known structures and techniques have not been shown in detail in order not to obscure the understanding of this description.

I. Liquid Crystalline Epoxy Monomer Compounds

An exemplary liquid crystalline epoxy monomer compound, according to one embodiment of the invention, may have the following chemical formula:

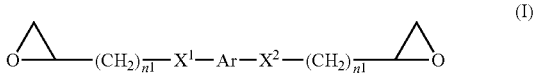

(I)

In this formula, Ar may include a liquid crystalline moiety, $X^1$ and $X^2$ may, independently of one another, be connecting groups selected from oxygen, carbonyl, carboxyl (O=C—O), oxycarbonyl (O—C=O), and amine, and $n^1$ and $n^2$ may, independently of one another, be a number selected from 2 to 20.

First, let's discuss the liquid crystalline moiety, Ar. The term liquid crystalline moiety generally refers to a shaped moiety, such as a rod-shaped moiety or a disc-shaped moiety, which is sufficient to at least promote orientational order of the compounds in the liquid phase. In one aspect, as in a nematic ordering of compounds, the mean direction of the compounds may be parallel or anti-parallel to an axis known as the director. The ordered fluid phase may provide anisotropy of physical properties (e.g., the properties vary with direction).

Numerous liquid crystalline moieties known in the arts may be employed. Suitable liquid crystalline moieties (Ar) include, but are not limited to, trans-stilbenediyl, triphenyl, 1,4-bis(phenoxycarbonyl)-cyclohexdiyl, and diphenyl 1,4-cyclohexane-dicarboxylate. Many other suitable liquid crystalline moieties are known in the arts. The liquid crystalline moieties may tend to include aryl groups, such as one or more phenyl groups, although there is no requirement that the entire group be aromatic or aryl. These moieties each have shapes or configurations that at least tend to promote alignment or orientational ordering of the compounds. One potential advantage of the compound is that known liquid crystalline moieties may optionally be employed. These moieties are often commercially available and their properties tend to be well characterized.

The liquid crystalline moiety (Ar) is connected on a first side thereof to $X^1$ and on a second side thereof to $X^2$. $X^1$ and $X^2$ may, independently of one another, represent oxygen, carbonyl, carboxyl, oxycarbonyl, or amine. $X^1$ connects the liquid crystalline moiety to a first aliphatic moiety, —$(CH_2)_{n1}$—, and $X^2$ connects the liquid crystalline moiety to a second aliphatic moiety, —$(CH_2)_{n2}$—.

Now, let's discuss the aliphatic moieties in greater detail. The aliphatic moieties generally represent flexible hydrocarbon chains. The lengths of the chains are determined by $n^1$ and $n^2$, which represent the number of carbon atoms in the first and second aliphatic moieties, respectively. In one embodiment of the invention, $n^1$ and $n^2$ may, independently of one another, be a number selected from 2 to 20. When the number of carbon atoms exceeds about 20, the compounds may tend to have high viscosities, and the temperature range between the melting point and the isotropic point, or the temperature where properties become the same in all directions, may tend to diminish. Often, the melting point may tend to increase and the isotropic point may tend to decrease. This may tend to limit the range over which the compounds are liquid crystalline. In an embodiment where lower viscosities are appropriate, and where it is appropriate to maintain more liquid crystalline character, it may be appropriate for $n^1$ and $n^2$ to be less than about 15. For example, in various alternate embodiments of the invention, $n^1$ and $n^2$ may, independently of one another, be a number from 2 to 10, 2 to 6, or 3 to 5.

Now, the flexible hydrocarbon chains may tend to disrupt the liquid crystalline characteristics of the compound. The amount of disruption of the liquid crystalline characteristics generally increases with increasing length of the chains (i.e., greater $n^1$ and $n^2$). Without being bound by theory, it is believed that a long and flexible hydrocarbon chain may reduce the capability of the compounds to order.

In one aspect, the ability to tailor the lengths of the chains may allow modifying or tailoring certain characteristics of the compound that depend upon the liquid crystalline character. One such characteristic is the melting point temperature of the compound. As previously discussed, liquid crystalline epoxy resins tend to have relatively high melting point temperatures. These high melting point temperatures may potentially limit the uses and applications of the compounds. However, the ability to tailor the lengths of the chains may allow reducing the melting point to a desired extent or tailoring the melting point temperature of the compound. Typically, disruption of the liquid crystalline characteristics of the compound corresponds to a reduction in the melting point temperature of the compound.

In one embodiment of the invention, $n^1$ and $n^2$ may be selected to be sufficiently great to reduce a melting point of the compound to a desired extent by reducing the liquid crystalline character of the compound due to the liquid crystalline moiety. Likewise, $n^1$ and $n^2$ may be selected to be sufficiently small to retain at least some liquid crystalline character of the compound in order to exploit low viscosity and other unique properties of liquid crystals. This ability to reduce the melting point temperature, while retaining at least some liquid crystalline character, may allow the low viscosity flow and other unique characteristics of the liquid crystalline epoxy resin compounds to be exploited in temperature-limited environments and applications.

One such temperature-limited application is the transfer molding of microelectronic devices during packaging. Much of the currently available transfer molding equipment used in the microelectronic device packaging industry is designed to perform transfer molding at a temperature between about 150 to 180° C., often at about 165° C. The equipment is often poorly suited for performing transfer molding at significantly greater temperatures. For example, the heating elements of the mold cavities, as well as other components, may be under-designed for such operation. The equipment may tend to perform poorly if utilized on many liquid crystalline epoxy resins, such as epoxylated trans-stilbenediol, which has a melting point temperature of about 210° C. Additionally, performing transfer molding at high temperatures approaching the softening point of solders may tend to promote solder sweep failures and decreased manufacturing yields.

In one embodiment of the invention, in which the compounds are employed in molding microelectronic devices, $n^1$ and $n^2$ may be sufficient, depending upon the particular liquid crystalline moiety, to achieve a melting point temperature that is below about 140° C. (for example between about 90 to 140° C.), while retaining liquid crystallinity at temperatures of from about 150 to 180° C. Often, the melting point and isotropic points may be reduced by commensurate amounts, so that the difference between these two temperatures, which generally defines a processing window over which liquid crystalline behavior may be exploited, may remain about the same. Due in part to the wide variety of liquid crystalline moieties, and the wide variety of potentially different combinations of $X^1$ and $X^2$ that may potentially be employed, placing a single precise circumference on $n^1$ and $n^2$ may tend to be difficult. However, often for highly liquid crystalline moieties, $n^1+n^2$ may tend to be less than about 10, and for lesser liquid crystalline moieties, $n^1+n^2$ may tend to be less than about 6.

To illustrate certain concepts, particular straight-chain, unsubstituted, aliphatic moieties have been employed, although other embodiments of the invention are not so limited. For one thing, the illustrated aliphatic moieties include only carbon and hydrogen, although this is not required. In another embodiment of the invention, one or more halogens, such as fluorine, chlorine, bromine, or iodine, may optionally be substituted one-for-one with hydrogen. Additionally, the use of a straight-chain aliphatic moiety is not required. In another embodiment of the invention, a limited number of short-chain methyl or ethyl branches may optionally be included. Generally, depending upon the particular liquid crystalline moiety, and depending upon the symmetry of the branches, it may be appropriate to avoid using an overly large number of branches, and/or overly large branches, which may tend to compromise the liquid crystalline capability of the compound. Depending upon the particular compound, even one or two t-butyl branches may tend to significantly disrupt liquid crystallinity.

Referring again to chemical formula (II), a first terminal epoxy group is attached to the first aliphatic moiety, —(CH$_2$)$_{n1}$—, and a second terminal epoxy group is attached to the second aliphatic moiety, —(CH$_2$)$_{n2}$—. In one aspect, the epoxy groups may be polymerized, for example with a curing agent. Accordingly, another embodiment of the invention may relate to a dimer, trimer, or other polymeric compound including a plurality of polymerized epoxy monomers.

Another exemplary liquid crystalline epoxy monomer compound, according to an embodiment of the invention, may have the following chemical formula:

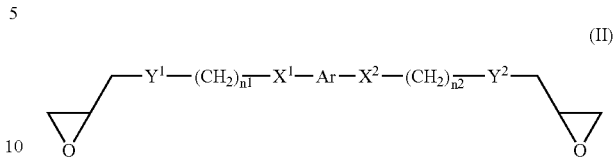

(II)

In this formula, Ar may include a liquid crystalline moiety, $X^1$ and $X^2$ may, independently of one another, be selected from oxygen, carbonyl, carboxyl, oxycarbonyl, and amine, $Y^1$ and $Y^2$ may, independently of one another, be selected from oxygen, carbonyl, carboxyl, oxycarbonyl, and amine, and $n^1$ and $n^2$ may, independently of one another, be numbers selected from 2 to 20.

The compound of formula (II) includes an internal moiety with the following chemical formula:

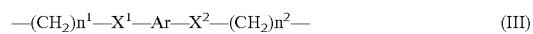

(III)

This internal moiety is similar to the internal moiety described in connection with the compound of chemical formula (I). In general, the internal moiety may have the same characteristics as previously described. In order to avoid obscuring the description, generally the discussion below will focus primarily on the different and/or additional aspects of the compound.

Referring again to chemical formula (II), a first aliphatic moiety, —(CH$_2$)n$^1$—, is bonded to $Y^1$ and a second aliphatic moiety, —(CH$_2$)n$^2$—, is bonded to $Y^2$. The $Y^1$ and $Y^2$ may, independently of one another, be connecting groups selected from oxygen, carbonyl, carboxyl, oxycarbonyl, and amine. $Y^1$ is connected by way of a —(CH$_2$)— group a first terminal epoxy group, and $Y^2$ is connected by way of a —(CH$_2$)— group to a second terminal epoxy group.

As discussed above, one potential advantage of using the compounds of formulas (I) and (II) is that known liquid crystalline moieties, such as trans-stilbenediyl, for example, may be employed. This may offer advantages, inasmuch as these moieties tend to be available and well characterized. However, as demonstrated below, other embodiments are also contemplated.

Another exemplary liquid crystalline monomer compound, according to an embodiment of the invention, may have the following chemical formula:

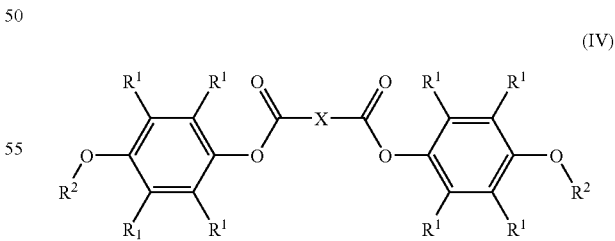

(IV)

In the formula, X may be selected from acetylene, vinyl, butadiene, an aryl group, and an alicyclic group, each $R^1$ may be independently selected from hydrogen, halogen, and $C_{1-3}$ alkyl groups optionally substituted with halogen, and each $R^2$ may be independently selected from a $C_{2-10}$ epoxy.

The X-group is located in an intermediate portion of the compound. In one embodiment of the invention, X may be selected from acetylene, vinyl, butadiene, a $C_{6-10}$ aryl group, and a $C_{5-10}$ alicyclic group. Suitable $C_{6-10}$ aryl groups include, but are not limited to, phenyl and napthyl. In another embodiment, larger aryl groups, such as polyaromatic hydrocarbons, may also potentially be employed. Suitable $C_{5-10}$ alicyclic groups include, but are not limited to, monocyclic rings, and polycyclic rings. Exemplary monocyclic rings include, but are not limited to, cyclopentyl, cyclohexyl, cycloheptyl, and cyclooctyl. Exemplary polycyclic rings, also known as cages, include, but are not limited to, tricyclo[3,3, 1,1$^{3,7}$]decane (also known as adamantane), bicyclo[2.2.1] heptane (also known as norborane), bicyclo[4.3.0]nonane, bicyclo[3.2.1]octane, and bicyclo[2.2.2]octane. In another embodiment, larger alicyclic cages having up to about thirty carbon atoms may also potentially be employed.

The X-group is connected with a first aryl group via a first ester linkage at a first side thereof, and connected with a second aryl group via a second ester linkage at a second side thereof. In the illustrated compound, the X-group is bonded to the carbonyl (C=O) groups of the ester linkages. In an alternate embodiment of the invention, the aryl groups may be bonded to the carbonyl groups of the ester linkages (see chemical formula VI).

The aryl groups, which in the illustrated compound include phenyl groups, tend to have rigid, planar configurations that may tend to promote orientational ordering of the compounds and liquid crystallinity. Often, the two aryl groups may give the compound a generally rod-like shape. In contrast, the ester linkages tend to be flexible and tend to bend and rotate. Such flexibility may tend to slightly reduce the liquid-crystalline characteristics of the compound, and correspondingly reduce the melting point and isotropic point temperatures of the compound.

Further, each of the aryl groups is substituted with four $R^1$ groups. Each $R^1$ may be independently selected from hydrogen, halogen, and $C_{1-3}$ alkyl groups optionally substituted with halogen. In one aspect, depending upon the liquid crystallinity provided by the aryl groups, depending upon the X-group, and depending upon the desired melting point, one or more of the $R^1$ groups may be selected to be non-hydrogen groups, such as halogens or $C_{1-3}$ alkyl groups. This may tend to disrupt the liquid crystallinity of the compound and reduce the melting point and isotropic transition temperatures. In general, the use of a large number of $C_{1-3}$ alkyl groups, or the use of several $C_3$ alkyl groups, may tend to significantly disrupt the liquid crystallinity.

Referring again to chemical formula (IV), a first and a second $R^2$-groups are connected to the first and second aryl groups, respectively. In the illustrated compound, they are connected in para-positions relative to the ester linkages, although this is not required. In another embodiment, the $R^2$-groups may be connected in potentially different meta- or ortho-positions. The meta- and ortho-positions may tend to reduce the rod-like character of the compound, and temper the liquid crystallinity.

Each $R^2$-group may be independently selected from a $C_{2-10}$ or $C_{2-5}$ epoxy group. Suitable epoxy groups include straight-chain epoxy groups and branched-chain epoxy groups. Suitable $C_{2-5}$ epoxy groups include, but are not limited to, 1,2-epoxyethane, glycidyloxy, 3,4-epoxypropyl, and the like. Diepoxy compounds, such as 1,2,3,4-diepoxybutane, are also suitable. Suitable $C_{2-10}$ epoxy groups include these aforementioned epoxy groups as well as those including longer, straight or branched alkyl chains, such as 1,2-epoxydecane. In general, a longer and more flexible epoxy group may tend to reduce the liquid crystalline character of the compound, and may tend to reduce the melting point and isotropic transition temperatures. In one aspect, the length of the epoxy groups may have a similar affect as the length of the hydrocarbon chains in chemical formula (I).

Now, let's discuss the X-group in greater detail. The different X-groups may affect the melting point temperatures and anisotropic-to-isotropic transition temperatures of the compounds. Table 1 lists data by others including melting point temperatures and anisotropic-to-isotropic transition temperatures for a class of non-epoxy compounds having the different X-groups listed and having the following chemical formula:

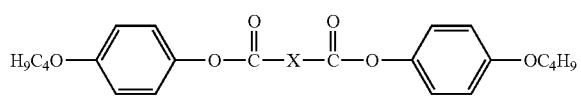

(V)

TABLE 1

| X-Group | Melting Point (° C.) | Isotropic Transition (° C.) |
|---|---|---|
| Phenyl | 188 | 235 |
| Norboryl | 113 | 226 |
| Cyclohexyl | 110 | 213 |
| Vinyl | 108 | 140 |
| Acetylene | 92 | 100 |

As shown, acetylene may reduce the melting point and isotropic transition temperatures more than vinyl, vinyl may reduce the temperatures more than cyclohexyl, cyclohexyl may reduce the temperatures more than norboryl, and norboryl may reduce the temperatures more than phenyl. Without wishing to be bound by theory, it is believed that an aryl group like phenyl tends to more rigid and less flexible than an alicyclic group, like norboryl, or cyclohexyl.

Viewed from one perspective, the data in Table 1 gives estimates of the melting point and isotropic transition temperatures for compounds of the chemical formulas (IV) (and also (VI)), for different X-groups, when $R^1$ are all hydrogen, and when the $R^2$ include about four carbons each. However, as disclosed in the chemical formula, all of the $R^1$ need not be hydrogen. Rather, the $R^1$ may be selected from hydrogen, halogen, or $C_{1-3}$ alkyl groups optionally substituted with halogen.

In one embodiment of the invention, the set of $R^1$-groups may be selected to adjust or tailor the melting point and isotropic transition temperatures. In general, substituting a halogen or $C_{1-3}$ alkyl group optionally substituted with halogen for hydrogen may tend to reduce the melting point and isotropic transition temperatures. Typically, a $C_3$ alkyl group may reduce the temperatures more than a $C_2$ alkyl group, and a $C_2$ alkyl group may reduce the temperatures more than a $C_1$ alkyl group. For halogens, the reduction may depend on the size of the halogen.

Based on the data in Table 1, a relatively greater disruption of liquid crystallinity may be appropriate for a compound including phenyl, than for a compound including cyclohexane, for example. The greater disruption may generally be achieved by including relatively more halogens or $C_{1-3}$ alkyl group optionally substituted with halogen in place of hydrogen. The greater disruption may also generally be achieved by using larger $C_{1-3}$ alkyl groups, such as $C_{2-3}$ alkyl groups.

In one particular embodiment of the invention, the set of $R^1$-groups may be selected to reduce the melting point temperature of the liquid crystalline epoxy compound to below about 140° C., while retaining liquid crystallinity at a temperature greater than about 150° C. To further illustrate, based on the data in Table 1, several hypothetical compounds that may tend to have these properties given as the following examples.

As one example, consider a compound in which X is cyclohexane, each $R^2$ is selected from a straight-chain $C_{2-6}$ epoxy, and either: each $R^1$ is hydrogen; one or two of the $R^1$ may be potentially different halogens; or one of the $R^1$ may be methyl or ethyl.

As another example, consider a compound in which X is norbornyl, each $R^2$ is selected from a straight-chain $C_{2-6}$ epoxy, and either: each $R^1$ is hydrogen; one or two of the $R^1$ may be potentially different halogens; one or two of the $R^1$ may be methyl or ethyl; or one of the $R^1$ may be propyl.

As yet another example, consider a compound in which X is phenyl, each $R^2$ is selected from a straight-chain $C_{2-6}$ epoxy, and either: two of the $R^1$ are $C_3$ alkyl; or about six of the $R^1$ may be $C_1$ alkyl.

Another exemplary liquid crystalline epoxy monomer compound, according to another embodiment of the invention, may have the following chemical formula:

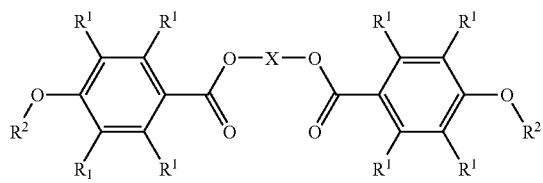

(VI)

As shown, this formula is similar to that of chemical formula (IV), with the exception that the aryl groups, rather than the X-group, are bonded to the carbonyl groups (C=O) of the ester linkages. Otherwise, the X-group, ester linkages, phenyl groups, $R^1$-groups, and $R^2$-groups may be as previously described.

II. Epoxy Molding Compositions

In one embodiment of the invention, one or more of the liquid crystalline epoxy monomer compounds disclosed herein may be included in an epoxy molding composition. Other ingredients that may optionally be included in the epoxy molding composition include, but are not limited to, one or more curing agents, curing accelerators, curing inhibitors, and fillers.

Suitable curing agents include, but are not limited to, polyphenol type and polynaphthol type novolac resins; polyaralkylphenol resins and polyaralkylnaphthol resins; alicyclic hydrocarbon-containing polyphenol resins and polynaphthol resins; cyclic phenols such as callixallene or the like; dihydric phenol compounds such as Bisphenol A, Bisphenol F, hydroquinone, resorcin, dihydroxynaphthalene, bis(4-hydroxyphenyl)ethane, bis(4-hydroxyphenyl)propane, and the like; halogenated bisphenols such as Tetrabromobisphenol A and the like; polyhydric phenols; polycarboxylic acids such as maleic acid, phthalic acid, nasic acid, methyltetrahydrophthalic acid, methyl-nasic acid and the like, and anhydrides thereof; polyanhydrides, polyamine compounds such as diaminodiphenylmethane, diaminodiphenyl sulfone, diaminodiphenyl ether, phenylenediamine, diaminodicyclohexylmethane, xylylene diamine, tolylene diamine, diaminocyclohexane, dichlorodiaminodiphenylmethane (including isomers), ethylene diamine, hexamethylenediamine and the like; and active hydrogen-containing compounds which can react with epoxy group such as dicyandiamide, tetramethylguanidine and the like. In one aspect, the molar ratio of curing agent to epoxy monomer may be from about 0.5 to 1.5 or from 0.7 to 1.2.

Typically, a curing accelerator, such as a catalyst, may be included in the composition. Suitable curing accelerators include, but are not limited to, organic phosphine compounds such as triphenylphosphine, tri-4-methylphenylphosphine, tri-4-methoxyphenylphosphine, tributylphosphine, trioctylphosphine, tri-2-cyanoethylphosphine and the like; organic phosphonium salts such as tetraphenylphosphonium tetraphenylborate and the like; tertiary amines such as tributylamine, triethylamine, 1,8-diazabicyclo(5,4,0)undecene-7, triamylamine and the like; quaternary ammonium salts such as benzyltrimethylammonium chloride, benzyltrimethylammonium hydroxide, triethylammonium tetraphenylborate and the like; imidazoles; boron trifluoride complexes; transition metal acetylacetonates; and radical initiators such as benzoyl peroxide, di-t-butyl peroxide, dicumyl peroxide, lauroyl peroxide, acetyl peroxide, methyl ethyl ketone peroxide, cyclohexanone peroxide, t-butyl hydroperoxide, azobisisobutyronitrile and the like. Typically, the molar ratio of curing agent to epoxy monomer may be from about 0.001:1 to 0.1:1.

If desired, a curing inhibitor may optionally be used in combination with the curing accelerator to adjust the rate of polymerization. Suitable curing inhibitors include, but are not limited to, phenol compounds such as 2,6-di-t-butyl-4-methylphenol, 2,2'-methylenebis(4-ethyl-6-t-butylphenol), 4,4'-methylenebis(2,6-di-t-butylphenol), 4,4'-thiobis(3-methyl-6-t-butylphenol), hydroquinone monomethyl ether and the like; polyhydric phenol compounds such as hydroquinone, catechol, p-t-butylcatechol, 2,5di-t-butylhydroquinone, methylhydroquinone, t-butylhydroquinone, pyrogallol and the like; phenothiazine compounds such as phenothiazine, benzophenothiazine, acetamidophenothiazine and the like; and N-nitrosamine compounds such as N-nitrosodiphenylamine, N-nitrosodimethylamine and the like. Typically, the molar ratio of curing inhibitor to epoxy monomer may be from about 0.001:1 to 0.05:1.

Often, particularly in microelectronic applications, it may be appropriate to include filler in the composition. The filler may be included, for example, to modify a physical property of the composition. In the case of using the composition to encapsulate a microelectronic device, the filler may be included to modify a coefficient of thermal expansion (CTE) of the composition so that it more closely approximates or matches a CTE of a material of the microelectronic device. In one aspect, the microelectronic device may include a silicon die, and the filler may have a CTE matched to that of silicon, like that of silicon, or at least comparable to that of silicon. As used herein, a CTE of a filler is comparable to that of silicon if it is closer to silicon than to an epoxy medium in which it is employed. This may help to allow the device and encapsulant to thermally expand and contract together. This may help to avoid potentially damaging mechanical stresses due to changes in temperature. Suitable fillers that have CTE that are comparable to that of silicon include, but are not limited to silicon particles, silica particles, sand, quartz, silicon dioxide, clay, and the like. In various aspects, the filler may be added in amounts of from about 50 to 95 wt %, or 75 to 95 wt %, based on the total weight of the composition.

If desired, in another aspect, the molding composition may optionally include one or more surface-adhesion promoters, mold release agents, stress stabilizers, flame retardants, or colorants. Suitable surface-adhesion promoters include, but are not limited to, various silane coupler compounds. An exemplary silane compound is 3,4-epoxypropyl trimethoxy silane. Suitable mold release agents include, but are not limited to, natural waxes, synthetic waxes, paraffins, silicon oils, and the like. An exemplary mold release agent is carnauba wax.

Suitable stress stabilizers include, but are not limited to, polybutadiene, butadiene-acrylonitrile copolymer, silicone rubber, silicone oil, emulsified acrylate rubber particles, and other elastomers. An exemplary stabilizer is epoxy terminated polybutadiene rubber. Suitable flame retardants include, but are not limited to, antimony trioxide, phosphorus compounds, brominated compounds, and the like. Exemplary flame retardant include brominated phenolic novolak resins and brominated epoxy resins. Suitable colorants include, but are not limited to, carbon black, various dyes, and the like. For example, carbon black is often used in molding compositions, and green dyes are often used in the epoxy compositions for dielectric substrates.

The epoxy compounds and one or more of the above-identified ingredients may be combined and mixed to form the compositions. In one aspect, the epoxy compound and the one or more other ingredients may be mixed using one or more of a blender, kneader, mill, or other resin-mixing device. After mixing, the mixed material may optionally be grinded to an appropriate particle size and, if desired, pressed or otherwise formed into pellets or other shaped solids.

III. Using Epoxy Molding Compositions on Microelectronic Devices

Recent tendencies in the microelectronic device packaging arts seem to enumerate the potential benefits of employing epoxy compounds with low viscosities. Many modern microelectronic packages employ high pad pitch, high wire density, and long wires. This may be due in part to a trend toward increased functionality, multiple-die stacking, and package-to-package stacking. A potential problem with the increasingly long wires, and high wire density, is increased potential for wire sweep failures due to flow of epoxy molding compound. In a representative wire sweep failure, the flow of the molding compound may cause unintended contact between two or more proximate wires, causing a short. A low viscosity epoxy molding composition may tend to reduce the potential for wire sweep.

Additionally, there is a trend in many packages, such as those used in modern cell phones and other compact electrical devices, toward thinner form factors. In order to reduce package heights, thinner mold caps are often employed. The thinner mold caps generally correspond to thinner gaps in the molds. A low viscosity epoxy molding composition may tend to flow through a thinner gap with greater ease.

Still further, in an effort to increase production of packaged devices, many manufacturers have employed larger mold cavities, have increased the density of packages in the cavities, and have reduced the mold cycle time. A low viscosity epoxy molding composition may tend to flow through the larger molds in a shorter a shorter period of time.

A liquid crystalline epoxy compound and composition as disclosed herein may tend to alleviate some of these pervasive problems and greatly advance the art of packaging microelectronic devices. In one embodiment of the invention, an epoxy composition as disclosed herein may be solidified over at least a portion of a surface of a semiconductor device (e.g., a silicon die), or other microelectronic device. A method, according to one embodiment of the invention, may include contacting the surface of the microelectronic device with the epoxy molding composition and then solidifying the composition on the surface. The solidified composition may tend to protect the device from the environment (e.g., moisture, temperature, contamination), protect the device from mechanical shock, provide structure and support, and/or provide electrical insulation.

In contacting the surface of the device with the composition, transfer molding, compression molding, or other approaches known in the microelectronic device packaging arts may optionally be employed. As one example, in the case of transfer molding, the microelectronic device may be introduced into a mold cavity, the epoxy mold compound may be heated to a temperature greater than its melting point temperature (e.g., a temperature greater than about 150° C.), pressure may be applied to the heated composition to force the composition into the mold cavity, the liquid composition in the cavity may contact the surface of the microelectronic device, and curing or other polymerization reactions may solidify the molding composition on the surface of the device. Further details of one exemplary embodiment of encapsulating a microelectronic device using an epoxy molding composition are given in Example 6.

IV. Other Uses of Epoxy Molding Compositions

In another exemplary embodiment of the invention, the epoxy compounds and compositions disclosed herein may be used to form dielectric substrates. Further details of one exemplary embodiment are given in Example 7. In still other embodiments of the invention, the epoxy compounds and compositions disclosed herein may be employed adhesives, plastics, plastic coatings, composite materials, or paints.

V. EXAMPLES

Example 1

Synthesizing Exemplary Epoxy Resin Compound

This prophetic example shows how to synthesize a liquid crystalline epoxy monomer compound having the chemical formula:

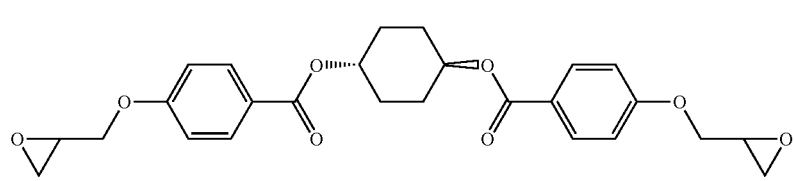

(VII)

In a first reaction stage, about 0.5 moles of trans-1,4-dihydroxycyclohexane and 0.25 moles of p-acetoxybenzoyl chloride may be dissolved in about 100 ml of pyridine and stirred at room temperature for about 6 hrs to encourage reaction.

The solution may be poured onto about 50 g of ice to precipitate the product. The solid may be filtered, washed with water, and then washed with ethanol. The solid material may then be purified by precipitating a concentrated methylene chloride solution into methanol, and then filtering and washing the resulting solid. In a second reaction stage, the acetyl protecting group may be removed by stirring the material in an acidified solution of isopropanol and water. In a third reaction stage, epoxidation may be achieved by dissolving about 0.3 moles of the diphenol material and about 0.7 moles of epichlorohydrin into about 100 ml of methanol. Then about 25 ml of a 48% aqueous solution of sodium hydroxide may be added dropwise over about 20 minutes while maintaining a solution temperature of about 30° C. Then the flask may be fitted with a reflux condenser and the solution may be refluxed for about 4 hrs. The solution may then be cooled and then neutralized with hydrochloric acid. The methanol may be removed by rotary evaporation. About 200 g of warm water may be added, and the resulting precipitate may be filtered, washed with water, and then dried in a vacuum oven at about 80° C. overnight. This general procedure may be modified, without undue experimentation, by those skilled in the art, and having the benefit of the present disclosure, in order to synthesize a wide variety of other compounds, having similar structure.

Example 2

Making Epoxy Resin Compound

This prophetic example shows how to synthesize a liquid crystalline epoxy monomer compound having the chemical formula:

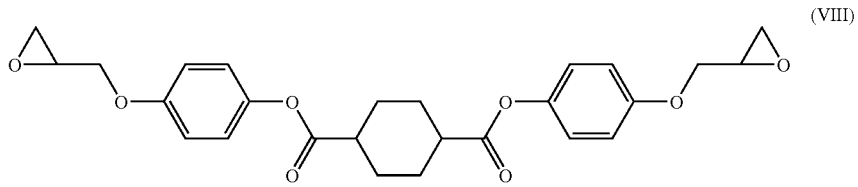

(VIII)

In a first reaction stage, about 0.25 moles of trans-1,4-cyclohexyldiacetyl chloride and 0.5 moles of p-acetoxyphenol may be dissolved in about 100 ml of pyridine and stirred at room temperature for about 6 hrs. The solution may be poured onto about 50 g of ice to precipitate the product. The solid may be filtered, washed with water, and then washed with ethanol. The materials may be purified by precipitating a concentrated methylene chloride solution into methanol. Then the resulting powder may be filtered and washed. In a second reaction stage, the acetyl protecting group may be removed by stirring the material in an acidified solution of isopropanol and water. In a third reaction stage, epoxidation may be achieved by dissolving about 0.2 moles of the diphenol material and about 0.7 moles of epichlorohydrin into about 100 ml of methanol. Then about 25 ml of a 48% aqueous solution of sodium hydroxide may be added dropwise over about 20 minutes while maintaining a solution temperature of about 30° C. Then the flask may be fitted with a reflux condenser and the solution may be refluxed for about 4 hrs. The solution may then be cooled and then neutralized with hydrochloric acid. The methanol may be removed by rotorary evaporation. About 200 g of warm water may be added, and the resulting precipitate may be filtered, washed with water, and then dried in a vacuum oven at about 80° C. overnight.

Example 3

Making Epoxy Resin Compound

This prophetic example shows how to synthesize a liquid crystalline epoxy monomer compound having the chemical formula:

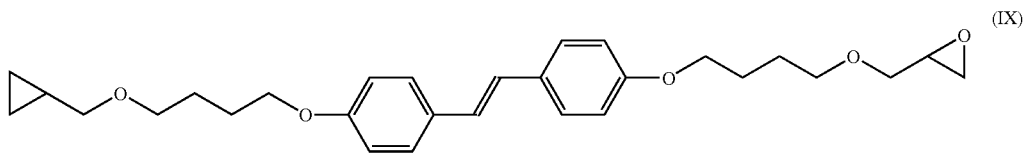

(IX)

In a first reaction stage, about 0.3 moles of trans-stilbene-diphenol and about 0.7 moles of 4-chlorobutyl allyl ether may be mixed with about 100 ml of methanol. Then about 25 ml of a 48% aqueous solution of sodium hydroxide may be added dropwise over about 20 minutes while maintaining a solution temperature of about 30° C. Then the flask may be fitted with a reflux condenser and the solution may be refluxed for about 4 hrs. The solution may then be cooled, and next neutralized with hydrochloric acid. The solution may then be extracted several times with methylene chloride. Then the methylene chloride solutions may be combined, dried over anhydrous magnesium sulfate overnight, filtered and then evaporated. In a second stage, the resulting material may be epoxidized by mixing about 0.2 moles of the material with about 0.3 g of anatase (K)—TiO$_2$ (support) impregnated with hexaammonium heptamolybdate in about 100 ml of toluene. Then about 0.5 mmol of tertiary-butyl hydroperoxide in toluene may be added and the mixture may be refluxed for about 6 hrs. The resulting mixture may be filtered, concentrated by evaporation and then added to about 100-ml of methanol to precipitate the product. The product may be collected by filtration and washing with methanol then water, and then dried overnight in a vacuum oven at about 80° C.

Example 4

Making Epoxy Molding Composition

This prophetic example shows how to make an exemplary epoxy molding composition using a liquid crystalline epoxy compound. Any of the epoxy compounds disclosed herein may be employed. In addition to the epoxy compound, other ingredients that may be used include Bisphenol F, silica, carnauba wax, 3,4-epoxypropyl trimethoxy silane, and triphenyl phosphine. Initially, about 13.5 g of the epoxy compound, 11.5 g of Bisphenol F, 75 g of silica, 0.3 g of carnauba wax, 0.2 g of 3,4-epoxypropyl trimethoxy silane, and 0.15 g of triphenyl phosphine may be added to a blender equipped with cooling, for example water-cooled grinding blades, that may be used to help maintain the temperature of the material at about 25° C. The ingredients may then be dry-blended. The dry-blended ingredients may be transferred to a roll mill and milled at about 110° C. The heated roll-milling tends to uniformly mix or compound the materials. The roll-milled material may be ground to a convenient particle size for pelleting. The ground material may be pressed into a pellet using a press with sufficient pressure to evacuate a majority of the air.

Example 5

Making Epoxy Molding Composition

As another prophetic example, a variation of the epoxy molding composition may be made by combining about 15 g of the epoxy compound, 10 g of Bisphenol F, 75 g of silica, 0.3 g of carnauba wax, 0.2 g of 3,4-epoxypropyl trimethoxy silane, and 0.15 g of triphenyl phosphine in the blender and preparing the composition as disclosed in the prior example.

Example 6

Using Epoxy Resin Composition

This prophetic example shows how to use the epoxy resin composition according to either of the previous two examples to encapsulate a microelectronic device using transfer molding. A microelectronic device, such as a die and die frame, may be placed into a mold cavity and the mold may be closed. A pellet may be placed in a pot at the top of the closed mold. A member such as a plunger may be placed in the pot above the molding composition. The composition may be heated to about 165° C. in order to melt the composition. Pressure may be applied to the plunger to force the melted composition into the cavity. The melted composition may flow over and around the exposed surfaces of the microelectronic device. The elevated temperatures may cure and solidify the molding composition in the mold. Then, the press may be opened and the molded microelectronic device may be removed from the cavity.

Example 7

Using Epoxy Resin Composition

This prophetic example shows how to use any of the epoxy compounds disclosed herein to form a dielectric substrate including a layer of cured epoxy material. Initially, an epoxy composition may be prepared by combining starting ingredients in a planetary mixer. The ingredients may include about 210 g methyl ethyl ketone, 60 g of the epoxy compound, 20 g of ortho-cresol novolak epoxy resin (215 g/eq), 15 g of epoxy-terminated polybutadiene rubber, 50 g of brominated phenolic novolak resin, 4 g of 2,4-diamino-6-(2-methyl-1-imadizolyethyl)-1,3,5-triazine-isocyanuric acid adduct, and 11 g of silica with a maximum particle size of 5 microns. In general, in forming such dielectric substrates, the silica may be employed at from about 0 to 40 wt %, or 5 to 15 wt %. The combined ingredients may be heated to about 80° C. and may be mixed at about 50 rpm for about 1 hr. The mixture may be milled by passing the mixture twice through a three-roll mill at a temperature of about 80° C. The heated milling may help to mix and compound the ingredients. The milled material may then be formed as a layer on a 40 μm thick or other thickness Mylar® brand polyester film. In one aspect, the layer may be cast or otherwise applied using approaches such as roll coating, reverse roll coating, gravure roll coating, reverse gravure coating, air knife coating, tension kiss coating, or variations thereof. The layer may be further formed by drying by heating the applied layer to about 100° C. for about 15 minutes. The dried layer may have a thickness of from about 25 to 70 μm. The film and dried layer may be laminated onto a substrate by vacuum lamination at about 120° C. and about 1 torr. In one aspect, the substrate may include a copper plated, fire retardant woven glass reinforced epoxy resin, such as in an FR4 substrate. Often, the copper on the top and bottom surfaces may include etched line and trace patterns. The layer may be cured at about 170° C. for about 2 hours. In one aspect, the dielectric substrate may be used as a support for microelectronic devices.

VI. Other Matters

While the invention has been described in terms of several embodiments, those skilled in the art will recognize that the invention is not limited to the embodiments described, but may be practiced with modification and alteration within the spirit and scope of the appended claims. The description is thus to be regarded as illustrative instead of limiting.

In the description above, for the purposes of explanation, numerous specific details have been set forth in order to provide a thorough understanding of the embodiments of the invention. It will be apparent, however, to one skilled in the art, that other embodiments may be practiced without some of these specific details. In other instances, well-known structures, devices, and techniques have been shown in block diagram form or without detail in order not to obscure the understanding of this description.

Many of the methods are described in their most basic form, but operations may be added to or deleted from the methods. It will be apparent to those skilled in the art that many further modifications and adaptations may be made. The particular embodiments are not provided to limit the invention but to illustrate it. The scope of the invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

In the claims, any element that does not explicitly state "means for" performing a specified function, or "step for" performing a specified function, is not to be interpreted as a "means" or "step" clause as specified in 35 U.S.C. Section 112, Paragraph 6. In particular, any use of "step of" in the claims herein is not intended to invoke the provisions of 35 U.S.C. Section 112, Paragraph 6.

What is claimed is:

1. A microelectronic device comprising:
   a semiconductor die having a surface;
   a material solidified on the surface from an epoxy molding composition comprising:
      a compound that has:
         at least one epoxy group;
         a melting point temperature of the compound that is less than 140° C.; and
         liquid crystallinity of the compound at a temperature greater than 150° C.; and
      a filler having a coefficient of thermal expansion that is closer to that of the semiconductor die than to the epoxy molding composition in which the filler is included.

2. The microelectronic device of claim 1, wherein the compound has a formula:

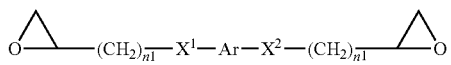

wherein
Ar includes a liquid crystalline moiety selected from trans-stilbenediyl, triphenyl, 1,4-bis(phenoxycarbonyl)cyclohexdiyl, and diphenyl 1,4-cyclohexane-dicarboxylate;
$X^1$ and $X^2$ independently of one another are selected from oxygen, carbonyl, carboxyl, oxycarbonyl, and amine; and
$n^1$ and $n^2$ independently of one another are numbers selected from 4 to 6.

3. The microelectronic device of claim 1, wherein the compound has a formula:

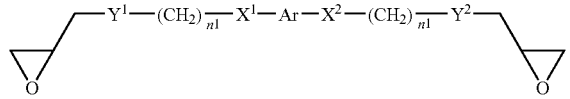

wherein
Ar includes a liquid crystalline moiety selected from trans-stilbenediyl, triphenyl, 1,4-bis(phenoxycarbonyl)cyclohexdiyl, diphenyl 1,4-cyclohexanedicaroxylate;
$X^1$ and $X^2$ independently of one another are selected from oxygen, carbonyl, carboxyl, oxycarbonyl, and amine;
$Y^1$ and $Y^2$ independently of one another are selected from oxygen, carbonyl, carboxyl, oxycarbonyl, and amine; and
$n^1$ and $n^2$ independently of one another are numbers selected from 4 to 6.

4. The microelectronic device of claim 1, wherein the compound has a formula:

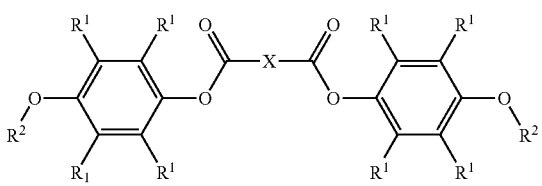

wherein
X is selected from a $C_{6-10}$ aryl group and a $C_{5-10}$ alicyclic group;
each $R^1$ is independently selected from hydrogen, halogen, and $C_{1-3}$ alkyl optionally substituted with halogen, provided that not more than four of the $R^1$ are $C_2$ alkyl optionally substituted with halogen, and provided that not more than three of the $R^1$ are $C_3$ alkyl optionally substituted with halogen; and
each $R^2$ is independently selected from a $C_{2-6}$ epoxy.

5. The microelectronic device of claim 1, wherein the compound has a formula:

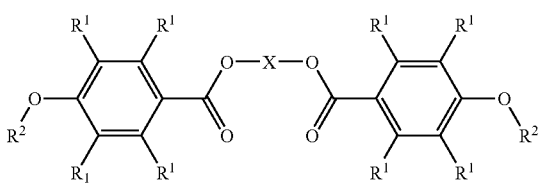

wherein
X is selected from a $C_{6-10}$ aryl group and a $C_{5-10}$ alicyclic group;
each $R^1$ is independently selected from hydrogen, halogen, and $C_{1-3}$ alkyl optionally substituted with halogen, provided that not more than four of the $R^1$ are $C_2$ alkyl optionally substituted with halogen, and provided that not more than three of the $R^1$ are $C_3$ alkyl optionally substituted with halogen;
each $R^2$ is independently selected from a $C_{2-6}$ epoxy.

6. The microelectronic device of claim 1, wherein the filler comprises one or more selected from silicon particles, silica particles, sand, quartz, silicon dioxide, and clay.

7. The microelectronic device of claim 1, wherein a weight percent of the filler in the composition ranges from 50 to 95 wt %.

8. The microelectronic device of claim 1, wherein the composition comprises:
   a curing agent;
   a curing accelerator; and
   a curing inhibitor.

9. The microelectronic device of claim 1, wherein the compound includes a liquid crystalline moiety selected from a rod-shaped liquid crystalline moiety and a disc-shaped liquid crystalline moiety, and wherein the compound includes a flexible aliphatic moiety including at least three carbon atoms.

10. The microelectronic device of claim 1, wherein the compound includes at least one liquid crystalline moiety selected from trans-stilbenediyl, triphenyl, 1,4-bis(phenoxycarbonyl)-cyclohexdiyl, and diphenyl 1,4-cyclohexane-dicarboxylate.

* * * * *